(12) United States Patent
Porter et al.

(10) Patent No.: US 7,051,334 B1
(45) Date of Patent: May 23, 2006

(54) DISTRIBUTED EXTRACT, TRANSFER, AND LOAD (ETL) COMPUTER METHOD

(75) Inventors: Duane L. Porter, Blue Springs, MO (US); David E. Swanholm, Stilwell, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 698 days.

(21) Appl. No.: 09/843,682

(22) Filed: Apr. 27, 2001

(51) Int. Cl.
*G06F 9/46* (2006.01)
(52) U.S. Cl. ...................................... 719/313; 709/201
(58) Field of Classification Search ............. 707/1–10, 707/101–104.1; 709/200–253; 719/311–317
See application file for complete search history.

(56) References Cited

U.S. PATENT DOCUMENTS

| | | | |
|---|---|---|---|
| 6,604,104 B1 * | 8/2003 | Smith | 707/10 |
| 6,704,768 B1 * | 3/2004 | Zombek et al. | 709/201 |
| 6,714,979 B1 * | 3/2004 | Brandt et al. | 709/225 |
| 6,850,947 B1 * | 2/2005 | Chung et al. | 707/101 |

FOREIGN PATENT DOCUMENTS

| | | | |
|---|---|---|---|
| EP | 1016989 | * | 5/2000 |
| EP | 1016989 A2 | * | 7/2000 |

OTHER PUBLICATIONS

"IBM's Business Integration with MQSeries and MQSeries Integrator," pp. 1-9, .software.ibm.com/tx/mqseries/busint.

"MQSeries integrator Version 2.0 Technical White Paper," pp. 1-29, .ibm.com/software/tx/mqseries/.
Feetham, Tim "The Imperatives of Real-Time Warehousing," pp. 1-5, The Data Warehousing Institute.
"Transforming The Financial Commerce Chain," pp. 1-8, Mercator.
"Executive Overview: Managing Real World B2B Integration," pp. 1-11, Vitria Technology, Inc.

\* cited by examiner

*Primary Examiner*—William Thomson
*Assistant Examiner*—Charles Emeka Anya (57) ABSTRACT

The present invention is a distributed extract, transform and load (ETL) method for delivering information within a computing environment, comprising extracting information from an information source and transforming the extracted information. The transformed information is isolated by wrapping the transformed information into a message envelope having a standard format. The message envelope is routed to at least one information target, unwrapped to reveal the received information, preferably transformed again, and loaded into the information target. The extraction, transformation, and adaptation steps on the source side are isolated from the routing step such that the extraction, transformation, and adaptation steps on the source side may be executed simultaneously for a plurality of information sources distributed across the computing environment to produce a plurality of message envelopes. The routing, unwrapping, mapping, transformation, and loading steps on the target side are repeated for each of the plurality of message envelopes.

27 Claims, 10 Drawing Sheets

DISTRIBUTED EXTRACT, TRANSFER, AND LOAD (ETL) COMPUTER METHOD

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention is a distributed extract, transfer, and load (ETL) computer method (hereinafter referred to as Distributed ETL) for linking together multiple information domains residing across an enterprise-wide computing environment in order to share corporate information, while reducing the time required to deliver that information. The invention overcomes the many-to-many relationships that exist between information sources and targets residing within each domain by implementing a central router to deliver information to and from these domains.

BACKGROUND OF THE INVENTION

Today, better integration of business information systems throughout the enterprise and incorporating more recent database management technologies results in real managerial competitive advantages. Information to support management decision making typically is extracted from operations systems and loaded into a data warehouse. Information as used herein includes data internal to a corporation that is generated in the day-to-day business operations of the corporation, aggregations and summaries of the internal data, and external information such as demographic and geospatial data that can be related to the internal data. A data warehouse is a large storage facility within the information technology, IT, system that typically holds the current and historical information across an entire enterprise. It most likely consists of numerous databases and may exist on multiple platforms (operating systems). A database can be defined as a collection of information organized in such a way that a computer program can quickly select desired pieces of data. One can think of a database as an electronic filing system.

In the past, it was only viewed as necessary to capture periodic data extracts supplied by operational computing systems to update the data warehouse on a weekly or monthly basis. Strategic dependence on data warehousing was viewed as long-term and historical, not as a real time activity. In contrast, today's business environment is worldwide and does not stop at five o'clock P.M. For example, the Internet allows commerce to continue 24 hours a day, seven days a week. As a result, customer service support and normal telephony operations within many business organizations likewise operate around the clock.

Furthermore, marketing practices have evolved from mass media advertising to more personalized target marketing, which cuts expenses while providing customized treatment. To enable customized marketing, companies must know and understand their customers. Much of this understanding is made possible through groups such as Decision Support Services (DSS), the business group within an enterprise that has traditionally supported data warehousing. To be effective in supporting the extended operating and marketing efforts of an enterprise, information should be processed and pushed back from DSS into the customer contact areas such as customer service support, telemarketing and advertising campaign management as rapidly as possible. Thus, it is preferred that DSS be capable of receiving, processing, and providing information on an ongoing, near real time basis.

This invention, referred to as Distributed ETL, improves on current DSS services by providing the advantages of scalability of an extract, transfer and load (ETL) application and the near real time event processing of an enterprise application integration (EAI) application without the disadvantages associated with each.

SUMMARY OF THE INVENTION

The present invention is a distributed extract, transform and load (ETL) method for delivering information within a computing environment, comprising extracting information from an information source and transforming the extracted information. The transformed information is isolated by wrapping the transformed information into a message envelope having a standard format. The message envelope is routed to at least one information target, unwrapped to reveal the received information, preferably transformed again, and loaded into the information target. The extraction, transformation, and adaptation steps on the source side are isolated from the routing step such that the extraction, transformation, and adaptation steps on the source side may be executed simultaneously for a plurality of information sources distributed across the computing environment to produce a plurality of message envelopes. The routing, unwrapping, mapping, transformation, and loading steps on the target side are repeated for each of the plurality of message envelopes.

DETAILED DESCRIPTION OF THE INVENTION

Within the enterprise, information takes many forms depending on its usage. In other words, the business usage of the information drives its resultant structure. This information can be grouped into information domains according to its business usage or function as shown diagrammatically in FIG. 1. The information domains include operations 10 used for daily operation information such as on-line transaction processing (OLTP); exploration zones 120 which includes data mining; data warehouse 40 which is the consolidated information store; and summarized views 150 used for predefined queries and on-line analytical processing (OLAP) reports.

Figure 1:
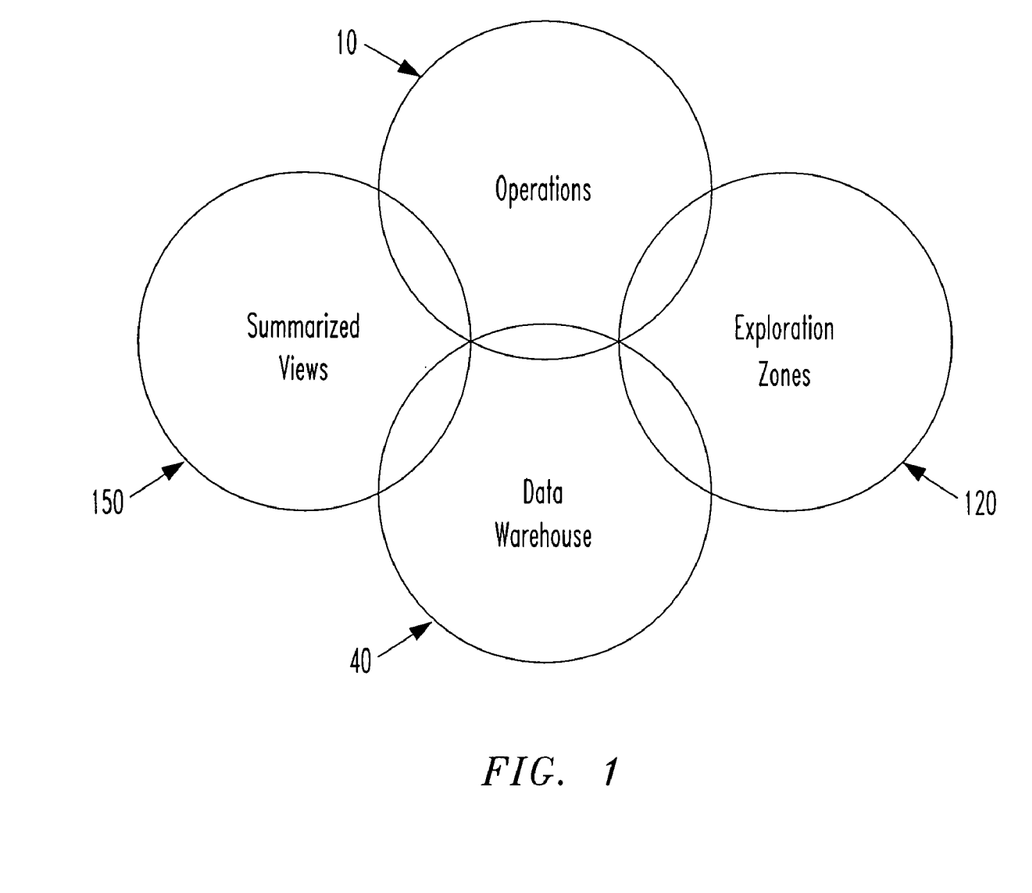
FIG. 1 is a diagrammatic representation of business information domains.

As shown in FIG. 1, the information domains overlap, indicating that the boundaries between business information domains are not absolutely crisp. Some warehouse information can be summarized, a characteristic of OLAP summary reporting, while OLAP tools sometimes drill down into detailed warehouse tables. Because of the differing data structures required to support the differing business uses for the data, the same information may be used for multiple business functions. Therefore, the information domains are interdependent upon each other. The relationship between information domains can become a complex web linking information sources and information targets. These relationships can be intermixed and multidirectional, thus defining a many-to-many relationship between business information domains.

Current enterprise application integration (EAI) applications, such as IBM's MQ Series, Tibco's Rendezvous or Saga's Saga Vista, are available to coordinate information flow between information domains to facilitate business processes. These traditional EAI systems are synchronous, transaction driven systems that operate in real time or near-real time, but have certain other disadvantages (e.g., scalability limitations). An alternative tool is a standard extract, transform and load (ETL) application, which is an asynchronous, batch driven system that can be scaled up but typically suffers from delayed event processing.

Figure 2:
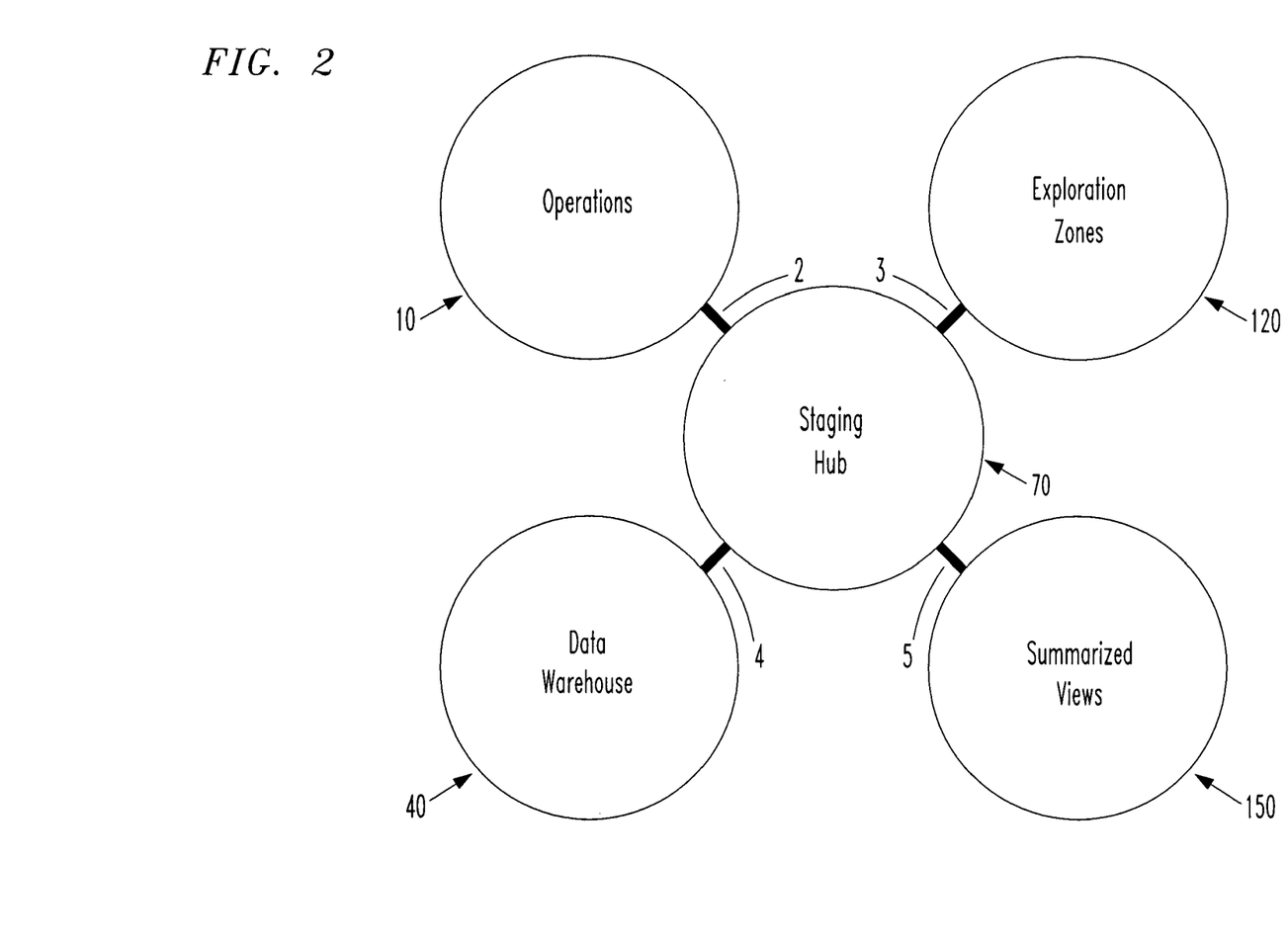
FIG. 2 is a diagrammatic representation of a basic hub and spoke architecture.

Traditional EAI applications direct the flow of information between domains through a center point called a hub, or more commonly a message broker to manage many-to-many relationships in a scalable manner. The hub and spoke architecture is applicable to managing ETL needs that exist between information domains as well. FIG. 2 is a diagrammatic representation of a basic hub and spoke architecture. The staging hub 70 is at the center of the hub and spoke figure with connecting spokes 2, 3, 4, and 5 to the various information domains, namely operations 10, exploration zones 120, data warehouse 40, and summarized views 150, respectively.

In contrast to the traditional EAI and standard ETL applications which rely on the basic hub and spoke architecture described above, this invention is a distributed extract, transfer, and load (ETL) computer application to address the need for linking multiple information sources and targets together to deliver shared corporate information, while reducing the time required to deliver that information. The Distributed ETL overcomes the many-to-many relationships that exist between information sources and targets by implementing a spartan central router passing information to and from these domains through "thick spokes."

Figure 3:
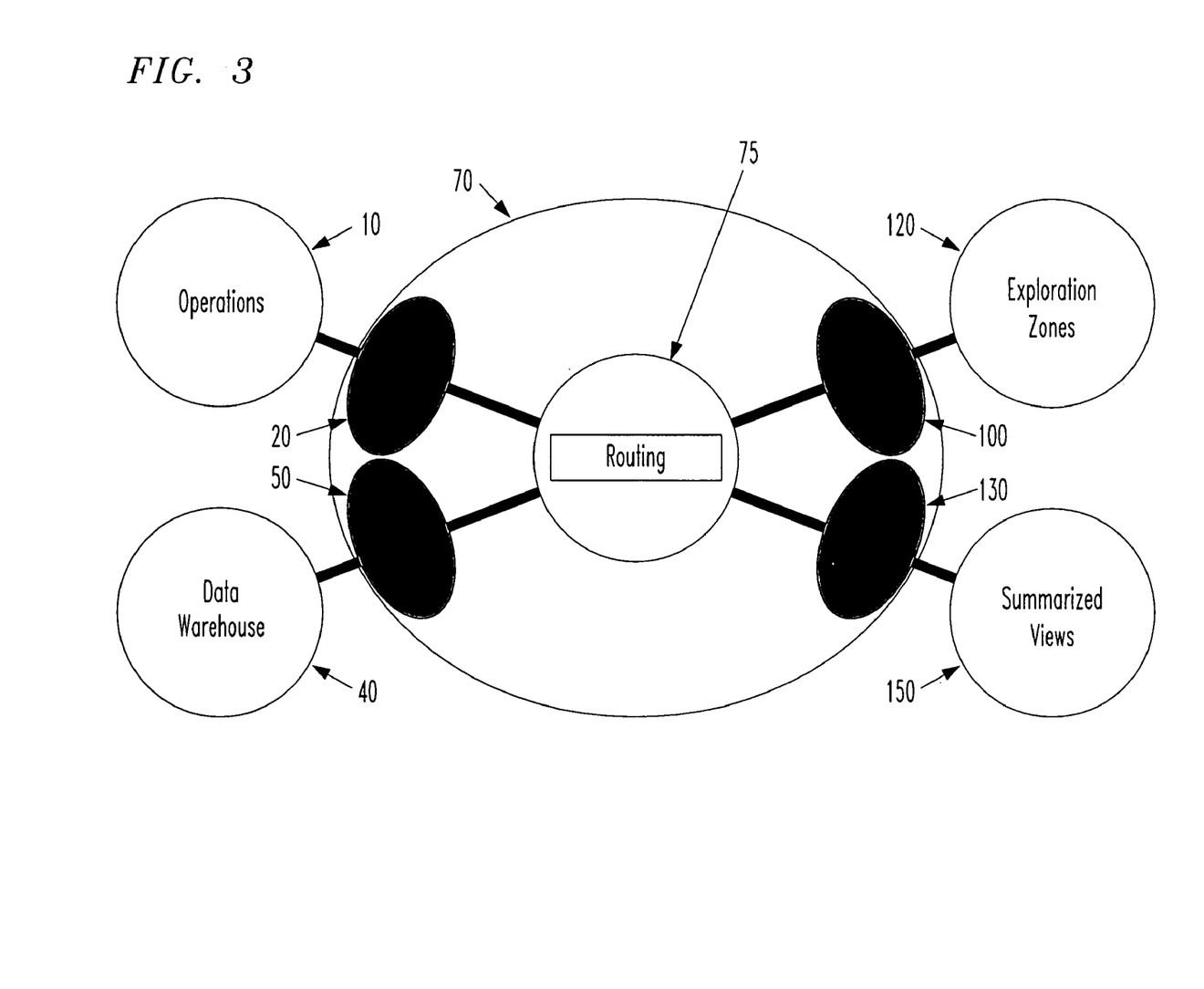
FIG. 3 depicts the Distributed ETL architecture of the current invention.

FIG. 3 depicts the Distributed ETL architecture of the current invention. Distributed ETL is comprised of two parts. First, a set of distributed "thick spokes" 20, 50, 100 and 130 which provide pre-routing information processing specific to sources connected by input spokes and post-routing information processing specific to targets connected by output spokes. Second, a spartan router component 75 serves as a central core by connecting the input and output thick spokes. Preferably, all shared information in the enterprise will flow through the router component.

The "thick" spokes 20, 50, 100 and 130 are used to manage specific source/target information processing (also referred to as staging processes, which comprise extraction, transformation, adaptation, and loading functions) as may be required prior to and/or after routing of the information. In contrast, the router component 75 is spartan in that it primarily manages delivery (i.e., routing) the information and does not perform processing steps thereon. Staging processes that are specific to a source or target are pushed out closer to where the spoke connects to that source or target, in contrast to being performed by the router component. By isolating the router component to purely delivery functions, the entire architecture is streamlined, enhancing its speed, efficiency, parallelism, and scalability. In sum, the architecture of the present invention comprises: 1) the staging processes to manipulate the information (in the "thick" spokes), and 2) the spartan router component to deliver the information. Therefore, the overall architecture can best be referred to as a Distributed ETL (extract, transform and load).

Figure 4:
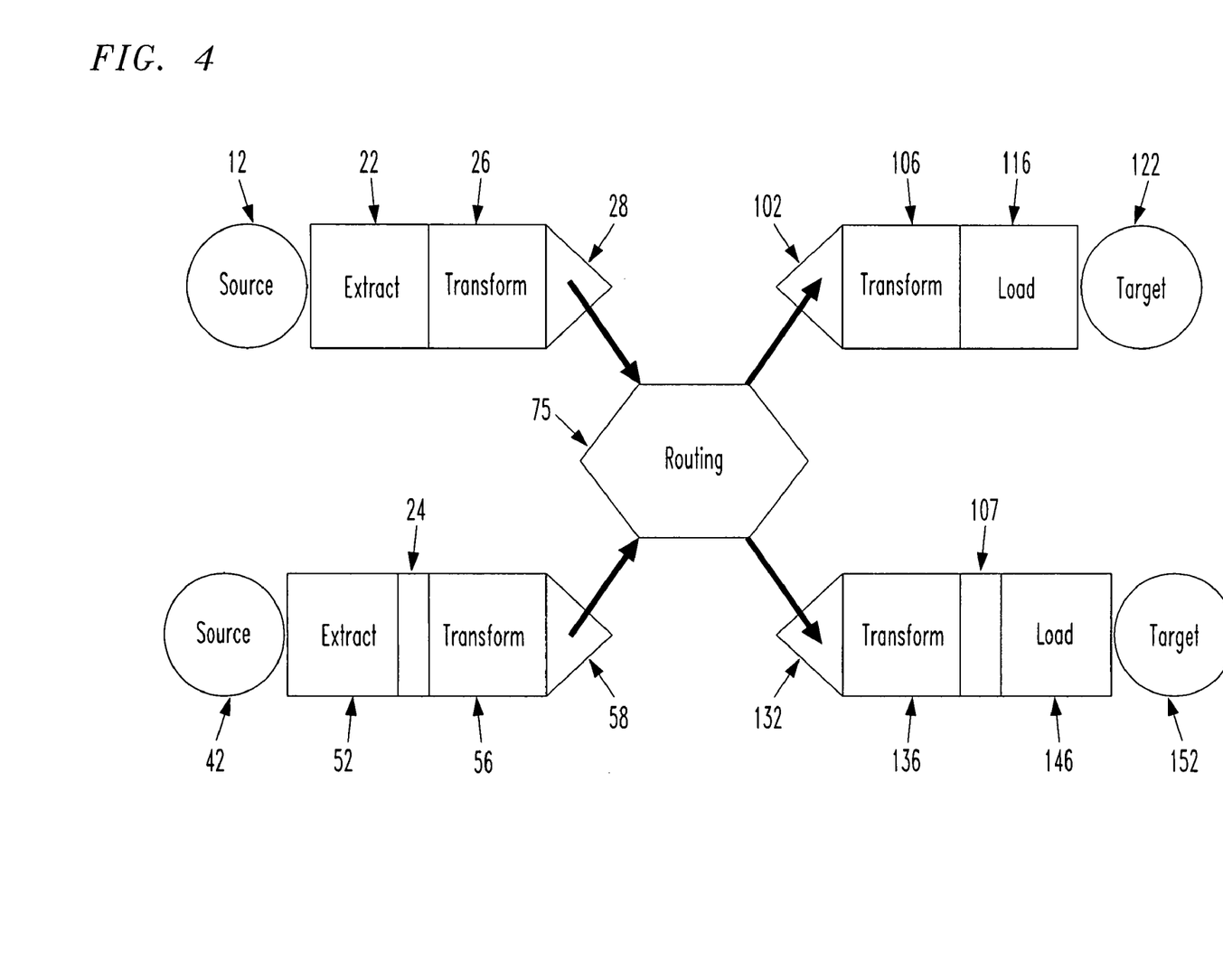
FIG. 4 is a diagrammatic representation of a staging area.

The staging processes, or the "thick" spokes of the Distributed ETL, are comprised of several software components to process information as necessary prior to and/or after routing it. Referring to FIG. 4, a Distributed ETL architecture is shown wherein information is being routed from any one of two information sources 12 and 42 to any one of two information targets 22 and 152. Any operable number of information sources and targets can be linked using the Distributed ETL of this invention, and the number of sources and targets shown in FIG. 4 was chosen for convenience purposes only. On the information source side of the router component 75 (i.e., the source "thick" spoke), the Distributed ETL comprises extract components 22 and 52; transform components 26 and 56; and source adapter components 28 and 58. On the information target side of the router component 75 (i.e., the target "thick" spoke), the Distributed ETL comprises target adapter components 102 and 132; transform components 106 and 136; and load components 116 and 146. Additional adapter components 24 and 107 may optionally be used on the source spoke and the target spoke, respectively. Combined, these components insolate the information sources and targets from the router component and provide a standard interface for the router.

The first step, beginning at an information source locations 12 or 42 involves the extraction of information by the extract component 22 or 52. The extract component is a software program that functions as a connector to an external information source for retrieving information from the source. Information can be pulled or pushed from the source, and preferably the source pushes the information to the Distributed ETL environment. In most cases, it is desirable to retrieve only updates, revisions, changes and the like to the information ("information changes"), as this limits the amount of information that needs to be delivered to the targets. Methods to extract the information changes from the source include:

1. A full extract of the source information is created, which is then compared against a previous full extract that was created at an earlier point in time. A detailed comparison between the two extracts generates the list of information changes.

2. A relational database management system (RDBMS) creates a log of all changes made to the database. This log can be read periodically to obtain the changes made to the source information.

3. The RDBMS can utilize what are called "triggers" that perform actions when certain data tables are affected and identified conditions occur, pushing the information changes to a table or queue that may be accessed for processing. The principal disadvantage to this approach is that it often loses transactional integrity. For example, where a single transaction for a customer spans several related tables, triggers looking for changes to only a single table may lose sight of the relationships needed to define all of the information changes.

4. The RDBMS can use a trigger to execute a "stored procedure" to capture information changes. In this case, the trigger executes when it senses a key relation change, and initiates a programmed stored procedure that gathers all information relevant to a logical transaction, based on the business rules for relationships contained in the referential integrity of the database design. The stored procedure then passes the information changes to the Distributed ETL with full transactional integrity.

The extracted information is then passed from extract component 22 or 52 to the transform component 26 or 56, respectively. Operational systems are the primary information sources in an enterprise and typically employ highly normalized data structures that optimize OLTP performance critical to real time, customer facing processes. Normalized data structures tend to use multiple tables to minimize recurring data forms and data redundancy. Data redundancy and recurring formats within records/rows can cause severe performance penalties in an environment having a high number of information updates. The fragmentation of normalized design, useful in operational systems, creates problems when shipping the information in a normalized format to remote targets. The target must know the business rules, or referential integrity, that logically ties the several table structures together as an integrated, functioning whole. In order to pass the normalized data in a message format, each piece of information must be tagged in a way that relates it to the other associated information so they can all be delivered together and assembled according to the master blueprint to a state of referential integrity, which is very impractical. Thus, in order to implement message based transport, denormalization of the data to some extent is required so that sufficient information is contained in each message to allow interested targets to easily identify and subscribe to events they wish to receive. This is the essence of packet based messaging, i.e., that each packet is self-addressed by the information contained within it. The denormalization process required to create these packets relies on transformation steps, with full knowledge of the source referential integrity rules (i.e., business rules governing the information structure).

The transform component's function is to perform transformations on the extracted information. As described above, transformation refers to the application of specific business rules governing the structure of the information. For example, captured information such as the price of a certain product and the quantity sold to a customer may need to be transformed. The desired form of this information might be the extended price. By applying the business rule for extended price, e.g., product price multiplied by quantity sold, the information has been transformed to the desired structure. Another example of information transformation is where a source captures customer names in the form of full name including the middle initial, e.g., John D. Smith. But, the desired form of this information for one specific target could be first and middle initials followed by the last name, e.g., J. D. Smith. Additionally, a different target may desire the same information in yet another format, such as last name first, followed by first name, followed by middle initial, e.g., Smith, John D. The last two examples demonstrate how two different targets can access the same source information and transform it in different ways that are acceptable to their business needs.

Transformations are used whenever the format of the information at the target, as defined by the business needs, does not match the format of the information extracted or arriving from the source. Stated alternatively, transformations are used to apply business rules that are common to the enterprise on the source side, and specific to the target on the target side. Typically, a source-side transformation is performed in order to facilitate packet based messaging, as discussed previously. Also, a target-side transformation typically is performed in order to facilitate the incorporation of information from multiple sources into a single target. In other words, a benefit of information targets is that they consolidate information from multiple sources, which frequently involves transformation. Even where a target receives information only from a single source, typically the target adds value by creating different perspectives of that information through aggregation and summarization, which also involve transformation. Where the target only displays detailed data without further transformation, such information may be read (i.e., queried) directly from an enterprise data warehouse, which typically has all source rules already applied. However, a data warehouse typically uses a normalized data structure, and thus a transformation may be required in SQL queries to return information in a meaningful format.

The transformed information is now ready to be delivered to the target but must first pass through the source adapter component 28 or 58. The source adapter component functions asynchronously as a connector to the router component 75 thereby isolating transformations from the router component and ensuring that the router component's primary function is delivery of the information (in contrast to the pre-routing information processing in the "thick" source spokes and the post-routing information processing in the "thick" target spokes). Herein lies (both for the source adapter and as discussed below, for the target adapter) the adapter component's primary function, to standardize and simplify the connection to the router component. The source adapter component 28 or 58 is implemented in software and wraps the transformed information in a standard message format, preferably a structured event format such as CosNotification, which is part of the publicly available CORBA standard. The CosNotification structured event is supported by various application server platforms such as WebLogic available from BEA Systems, Inc. Hereinafter, the adapted information is referred to as a message envelope.

The message envelope is sent to a message queue by the adapter to await distribution via the router component 75. The source adapter must be intimately aware of content of the extracted and transformed information given that a single source may provide multiple types of information such as an addition, a revision, or a deletion of information.

Because some targets may wish to subscribe to, or receive, only some of these information types, the source adapter must provide the specific information type for each message envelope sent to the router. To do this, the source adapter must have access to the business rules that define how to identify each type of information. For example, a certain code or date value may differentiate between an addition and a revision. Once the information type is identified, the source adapter tags the message envelope header with the proper message name (also referred to as the source ID) that will then be used for routing to the appropriate subscribing targets.

Meta data is used for control and management of information within the Distributed ETL application. Meta data is defined as "data about data" or facts about the information architecture within an organization. Meta data describes how, when, and by whom a particular set of information was collected, and how the information is formatted. Meta data is essential for understanding information stored in data warehouses, and the meta data is stored in a meta data repository. An example of meta data stored in the repository is transformation rules that describe how to move information from a transactional source database to a multidimensional target database and the aggregations and calculations that are applied to the information coincident to such a move. Another example of meta data in the repository is business rules (such as the definition of revenue or a common list of product codes) that multiple software components may want to access. Another example is when moving information from a source to a target, the meta data is checked to determine the appropriate characteristics of the data. For example, where a numeric field is required, an alpha numeric information piece would be rejected. When the adapter component detects such an error, the adapter may either route the information to an error queue rather than sending it on to the router component, or alternatively correct the information on the fly according to predetermined business rules. In sum, meta data provides transparent access to information.

Because the information processing within the thick spokes of the Distributed ETL runs in parallel, synchronization is important and can be accomplished by tracking the information with meta data. The source adapter component utilizes a meta data repository to provide a "road map" and rules for the information that it processes. The meta data stored within the meta data repository can be referred to as the content definition. Analogous to a COBOL copybook in a COBOL program, the content definition specifies the structure and naming conventions for the content, that is how specific fields are names, field sizes, formats, etc. within the record content. The key associated with this content definition that defines where in the meta data repository the full content definition can be found is referred to as the content definition ID. These are the keys to the meta data and only the keys need to be passed through the router component rather than the whole content definition.

In a preferred embodiment, the target knows the source that it will be subscribing to in advance and simply references the content definition from the metadata repository when the target adapter is constructed. Thus, no content definition IDs (i.e., keys) need to be passed at all. Alternatively, where the content of each message may rely on a different document type definition (DTD) format, for example source information comprising extended markup language (XML) files, the key for the DTD may be sent with the message for retrieval on the target side rather than shipping the entire DTD with each message envelope. This significantly reduces the data transmitted and increases efficiency.

Figure 6:
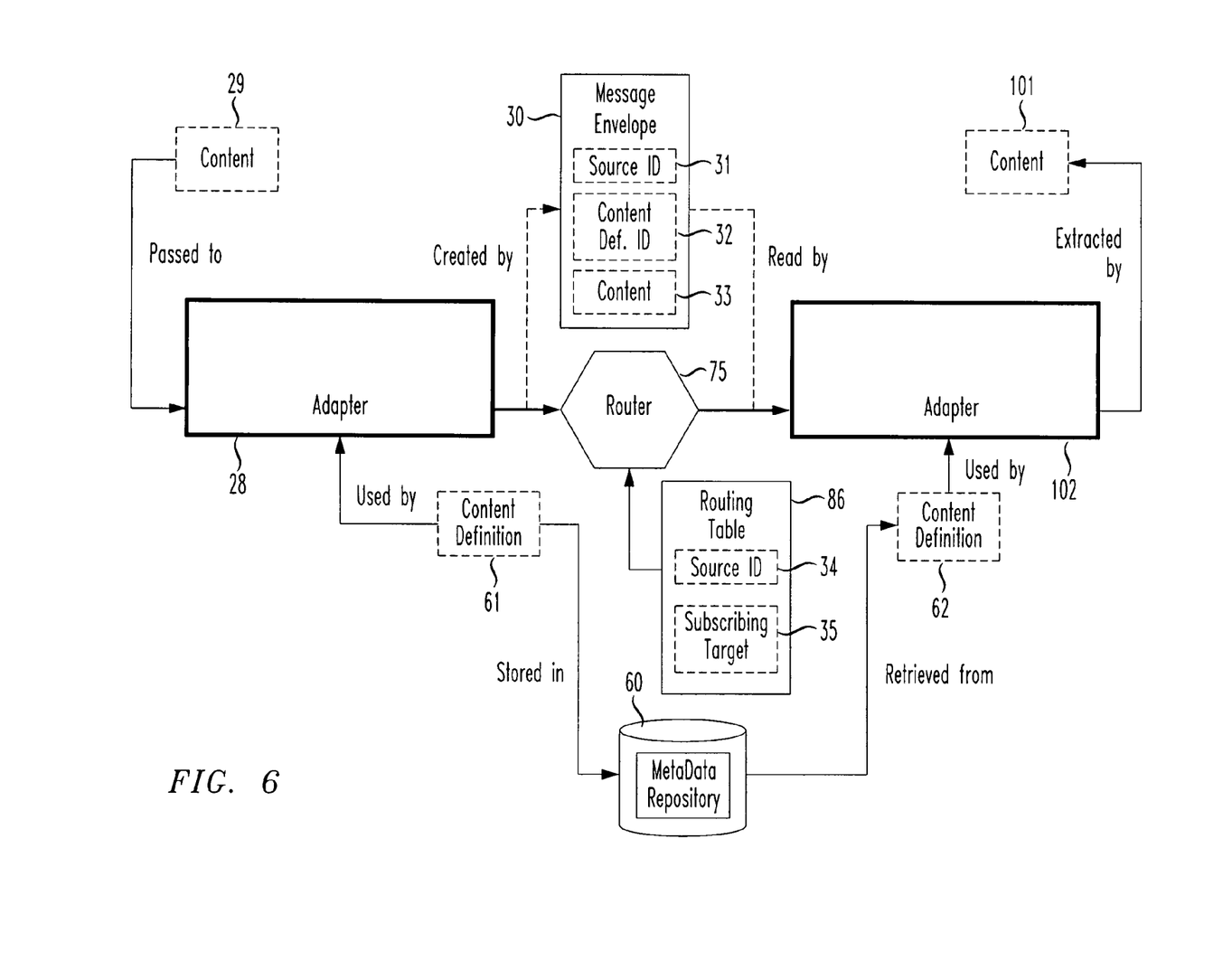
FIG. 6 depicts the utilization of the meta data repository by the adapter component of the Distributed ETL application and a parsing of the message envelope that is distributed by the router component.

The utilization of the meta data repository by the adapter components of the Distributed ETL application and a parsing of the message envelope that is distributed by the router component are depicted in FIG. 6. The source adapter component 28 pulls the content definition 61 from the meta data repository 60. The adapter then uses the content definition 61 to help process the transformed information (referred to as content 29) passed to it from the transform component as previously described in FIG. 4. The content is the information extracted from the source, expanded and/or modified by the transform, and its definition is stored in the metadata store. Preferably, the content definition is defined and stored prior to the processing of any information by the adapter. The adapter creates the message envelope (using a structured event format) by performing simple mapping of the content to a uniform format and by building header information such as the message name and source ID, which is used to route the message envelope.

Figure 5:
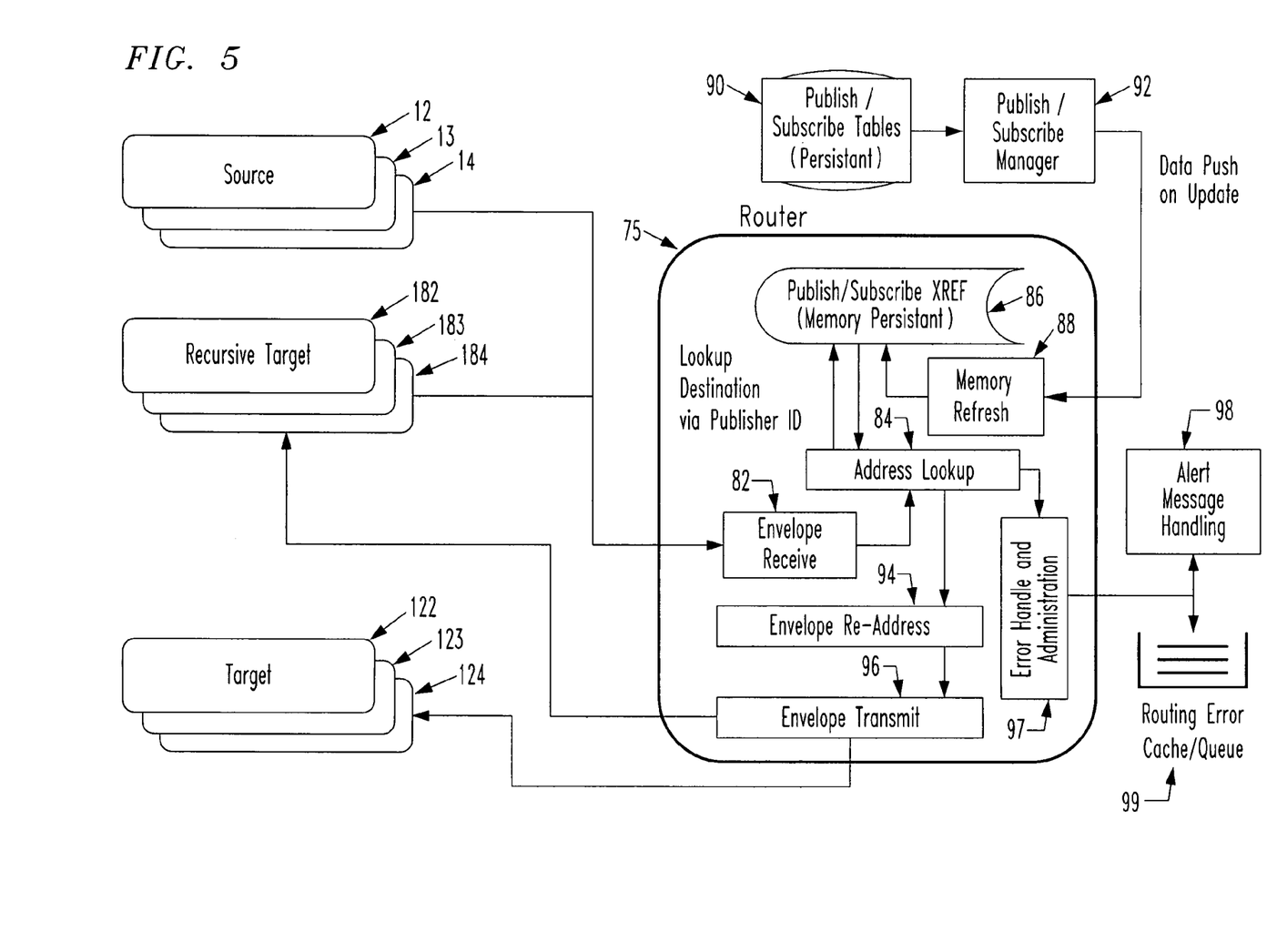
FIG. 5 is a detailed diagrammatic representation of the router components.

The adapter component attaches a header to the content creating a message envelope 30. The header includes a source ID 31 used to route the content to the appropriate targets by the router component. The message envelope 30 may also contain the content definition ID 32 and preferably will include the content 33. The router component delivers the message envelope 30 by utilizing a router table 86 as shown in FIG. 5 and discussed below. The router table 86 is stored in local memory to do an address lookup to find the subscribing target 35 and match its source ID 34 with the source ID 31 in the message envelope 30.

Referring to FIG. 4 on the exiting side of the routing function (i.e., the thick target spoke), near the target or targets, additional adapters 102 and/or 132 implemented in software read the router component output queue and remove the envelope from the distributed information. Referring to FIG. 6 the adapter 102 retrieves the content definition 62 from the meta data repository 60 by reference to the content definition ID 32 of the retrieved message envelope 30. Referring to FIG. 4 transformations can be made in the target thick spoke (i.e., post-delivery by the router component), if necessary, according to the target requirements, with an additional transform component 106 or 136. The information is then passed to the respective load component 116 or 146. The load component preferably uses an Application Programming Interface (API) software function to load the information into the target 122 and 152. An API is useful to abstract the load operation from the specific characteristics of a given physical datastore/file. In a typical embodiment, the target is a data warehouse and/or a data mart.

Multiple adapters are possible in the source and target thick spokes, as shown in FIG. 4. On the source side, additional source adapter 24 is shown between the extract component 52 and transform component 56. On the target side, additional target adapter 107 is shown between transform component 136 and load component 146. These additional adapters allow for different technologies to coexist without requiring extensive and costly integration. For example, an additional adapter may be used on the source side for transporting an extracted file to a different platform for transformation. Another example, an additional adapter may be used to enable a transactional system to flow events directly into a transformation process in near-real-time (shown as process 7 in FIG. 7).

The router component 75 is an important component in the Distributed ETL, because all information sources and targets are connected through it. The key function of the router component is to successfully route each message envelope from its publishing source to a single subscribing target or multiple subscribing targets. It is comprised of multiple software components that are message based, reading input from and writing output to message queues, and should be generalized to the extreme. Ideally, routing should be easy to change and require a minimal time to execute.

The router component 75 uses memory-based messaging to transfer information between publishing sources and subscribing targets. More specifically, messaging occurs on the source side between the source adapter and the router and on the target side between the router and the target adapter. In summary, information is extracted from a source and transformed. The adapter component creates the message envelope and publishes the source message to the router via a message queuing mechanism. The router subscribes to all source queues, thereby receiving the message envelopes to be routed. The router performs a lookup in the routing tables using the source ID as a key. The router publishes the message envelope to one or more target destination queues. The target adapter subscribes to a message queuing mechanism, unwraps the message envelope, and passes the information to a target transformation component. The information is then passed to a load component where it is written directly to the ultimate target. Linking distributed sources or targets with messaging functionality enables a minimum handling time per unit of information. Pairing transactional information extraction and loading with messaging enables near real time processing of extraction and loading functions.

Guaranteed message delivery as a part of the publish and subscribe functionality is important to ensure system reliability and verify that during exchange of messages no information packets are lost. When the network is available, messages will be delivered immediately. When the network is down, messages are still guaranteed to be delivered, eventually, but with some latency. In the latter case, middleware guarantees that messages are delivered as long as the network becomes available within a specified time period. In addition, messaging should provide the assurance of non-duplicate delivery, meaning the messages are only delivered once.

Messaging utilizes a queue system, which allows for a plurality of information sources to simultaneously publish to a router component inbox queue, preferably where each of the sources is capable of publishing independently of the others. A source (via the extract, transform, and adapt components discussed previously) can publish to an inbox queue while the router component is subscribing to that inbox queue. Unlike a sequential file, the router component can read message envelopes from the front of the inbox queue at the same time that the source is publishing new message envelopes into the back of the inbox queue. This allows faster aggregate throughput than a traditional batch environment. A router component can then publish a message envelope to a subscribing target's queue, which the target can access (as discussed previously with regard to the target adapter) and store for later retrieval matching its business cycle needs.

Performing its functionality in memory keeps the router component robust, as memory is hundreds to thousands of times faster to access than disk. Thus, it is preferred to use routing tables that can be maintained in memory for the control of routing destinations. The routing tables are backed up by persistent storage such that the tables may be reloaded to memory when the power is restored after a failure, or to update the content of the table when target subscriptions are changed.

FIG. 5 is a diagrammatic representation of the router components and functionality comprising the Distributed ETL architecture. The router component 75 receives a message envelope 82 from any one of multiple sources 12, 13, 14, 182, 183 or 184 through the thick source spokes and the inbox queue discussed previously. The message envelope is then passed to an address lookup 84 where a publish/subscribe cross-reference table 86 (also referred to as a router table) is accessed to determine where the message envelope is to be sent. The header on the message envelope identifying the publisher (i.e., source) corresponds to a list of subscribers (i.e., targets) in the cross-reference table 86 so the router component can determine the routing destination. The message envelope is then sent from Address Lookup 84 to Envelope Re-Address 94 where the target address is added to the message envelope. In an alternative embodiment, the source adapter automatically sends the message envelope to the router, which in turn routes the message envelope based upon the originating source (via the lookup table) and with the original source name intact. In other words, the target address is found in the lookup table and is not placed upon the message itself. The message envelope is then sent out to the appropriate target via Envelope Transmit 96. The output from the router component is written to an output queue that will be read by an adapter component on the target side of the distribution function. Persistent Publish/Subscribe Tables 90 are updated through a Publish/Subscribe Manager 92, which provides a Graphic User Interface (GUI) configured for table management. These updates are sent to the Memory Refresh 88 to provide current entries in Publish/Subscribe cross-reference table 86. Addresses contained within the cross-reference table are stored in local memory within the router to quicken address lookup time. The Error Handle and Administration 97 handles errors by sending an error message, Alert Message Handling 98 and storing the errors in a Routing Error Cache/Queue 99.

Downstream of the routing function another adapter 102 reads the message envelope 30. It uses the content definition 62 retrieved from the meta data repository 60 to extract the content 101 from the distributed information, as described previously. The information is subsequently processed in the thick target spoke on its way to the appropriate target as described previously in relation to FIG. 4.

Figure 7:
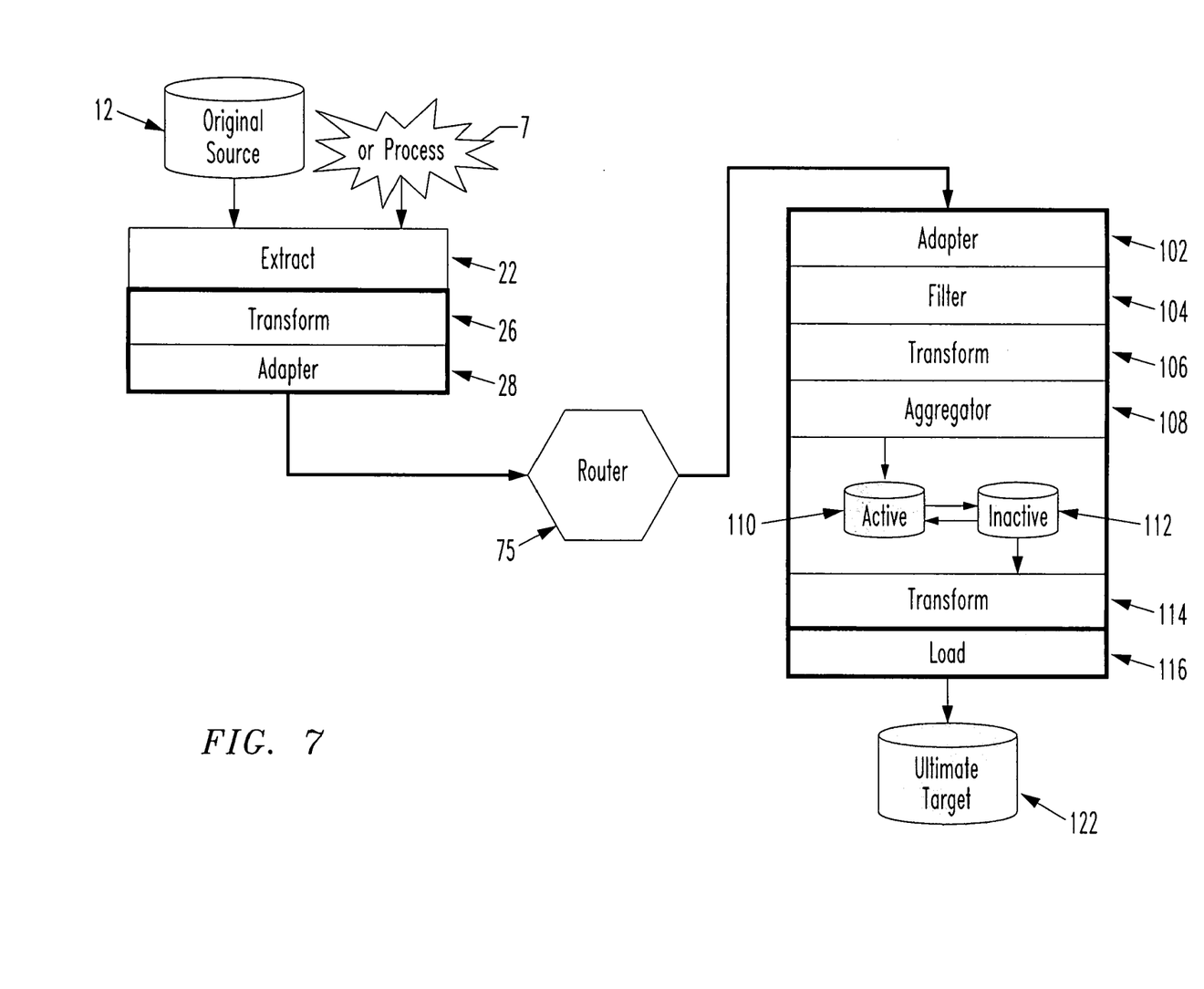
FIG. 7 is a more detailed diagram of the source and target spoke components.

FIG. 7 is a more detailed diagram of the components comprising the thick source and target spokes. As described previously, information is extracted from the information source 12 or process 7 by the extract component 22. The extracted information is passed to the transform component 26 where the information is transformed. The extracted, transformed information is sent through the adapter component 28 where it is wrapped in a message envelope and sent to the inbox queue for delivery by the router component 75.

On the output side of the router component 75, the adapter component 102 reads the information from a message queue and takes the information out of the message envelope (removes the header). In a preferred embodiment, the source information (including the type of information such as an addition, deletion, etc.) contained within the message envelope is specific enough such that the router component can route the message envelope only to targets desiring (i.e., subscribing) such information, thereby eliminating the need for filtering. In a non-preferred embodiment, the adapter component 102 passes the information through an optional filter component 104. The filter component's function is to only accept information required by the target and to reject non-conforming information. The filtered information may now undergo more transformations by the transform component 106 that can be applied at the event level, i.e., one message at a time. In other words, all information need not be made available at the same time such as sorting a group of records, all of which must be made available in order to perform the search. In contrast for example, a trunk code could be used in a message to perform a lookup and the trunk location returned to update the same record. Where the information has been acquired continuously over a period of time, the information in a preferred embodiment is passed to the time-period aggregator component 108. Here the information can be accumulated in an "active" partition or file and later retrieved by toggling the "active" partition 110 to an "inactive" state 112, allowing it to be read into the target transformation. The information can be held to accommodate a business time cycle, e.g., weekly or monthly reporting. When the partition is toggled to an inactivate state 112, the accumulated information can now be passed on for additional transformations by an additional target transform component 114 where necessary. This level of aggregation (in contrast to a time period aggregation) accommodates business aggregations, e.g. by region, product, salesperson, etc. as well as other transformation logic such as any matching operations if multiple information sources are received for consolidation. The information is then passed to the loading component 116 where the information is finally loaded into the target 122 typically as a batch process.

Figure 8:
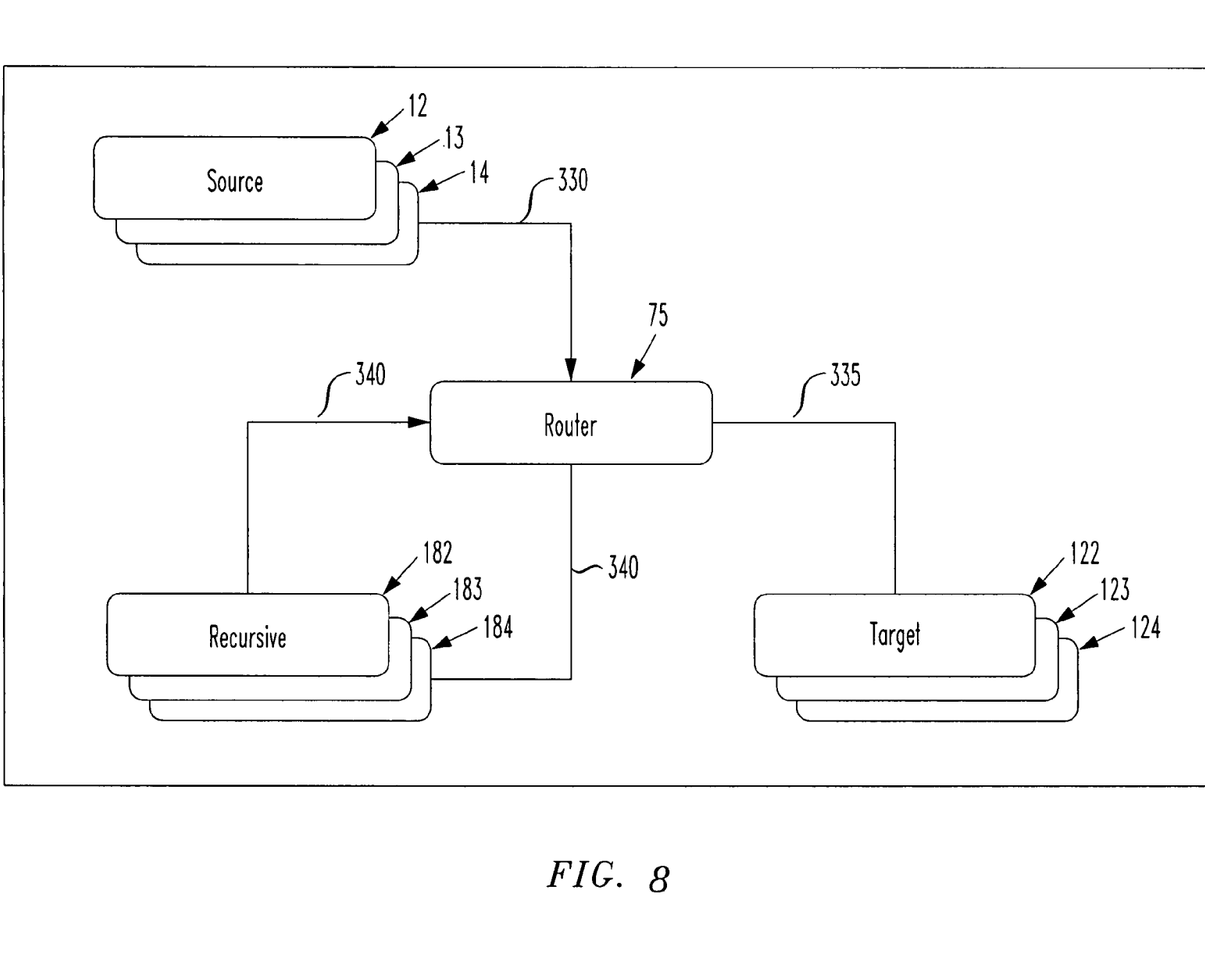
FIG. 8 is a diagrammatic representation of information flow with the Distributed ETL implemented on a single platform.

FIG. 8 is a diagrammatic representation of information flow on a single platform of a Distributed ETL. A single platform means that all the information sources and targets are routed through one router component. The single platform could represent a small company's information system or a portion of a larger company's information system. There can be multiple sources 12, 13 and 14 (connected to the router component by thick source spoke 330) and multiple targets 122, 123 and 124 (connected to the router component by thick target spoke 335). Note that targets can also be sources 182, 183 and 184 known as recursive targets, both receiving information through a thick target spoke 340 and sending information through a thick source spoke 340. A recursive target receives information from the router, adds some unique transformation value to the information and sends it back through the router to another specific target or targets. A recursive spoke does not send out the same information it receives. Information flow begins at the information source 12, 13 or 14 travels through thick source spoke 330 to the router component 75 and then on through thick target spoke 335 or 340 to either the information target 122, 123 or 124 or to the recursive target 182, 183 or 184, respectively. The uniquely transformed values from the recursive targets are then routed back through thick source spoke 340 to the router component 75 and on through thick target spoke 335 to the information target 122, 123 or 124.

Figure 9:
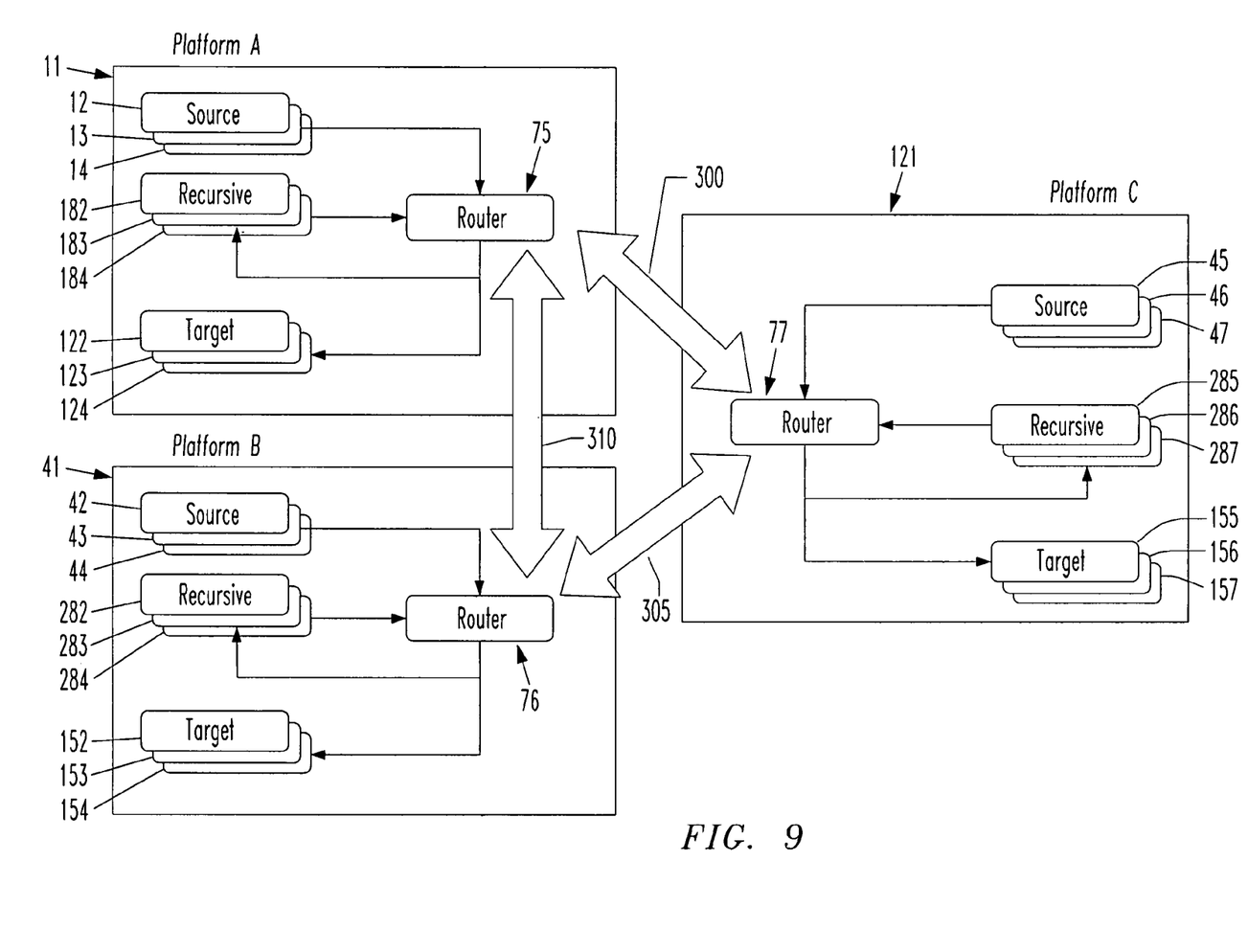
FIG. 9 is a diagrammatic representation of a preferred embodiment of the Distributed ETL routing across multiple platforms.

In contrast to the single platform structure of FIG. 8, FIG. 9 is a diagrammatic representation of a preferred embodiment of the Distributed ETL routing environment across multiple platforms. A plurality of sources and targets 12–14, 42–47, 182–184, 122–124, 152–157, 282–287 within an enterprise can be logically grouped into multiple platforms as shown with platform A 11, platform B 41, and platform C 121. By introducing multiple routers 75, 76 and 77 into the overall architecture which deliver message envelopes to one another a represented by arrows 300, 305, and 310, better utilization of bandwidth between devices can further enhance efficiency as well as make the design easier to scale up to very large business intelligence integration systems.

Figure 10:
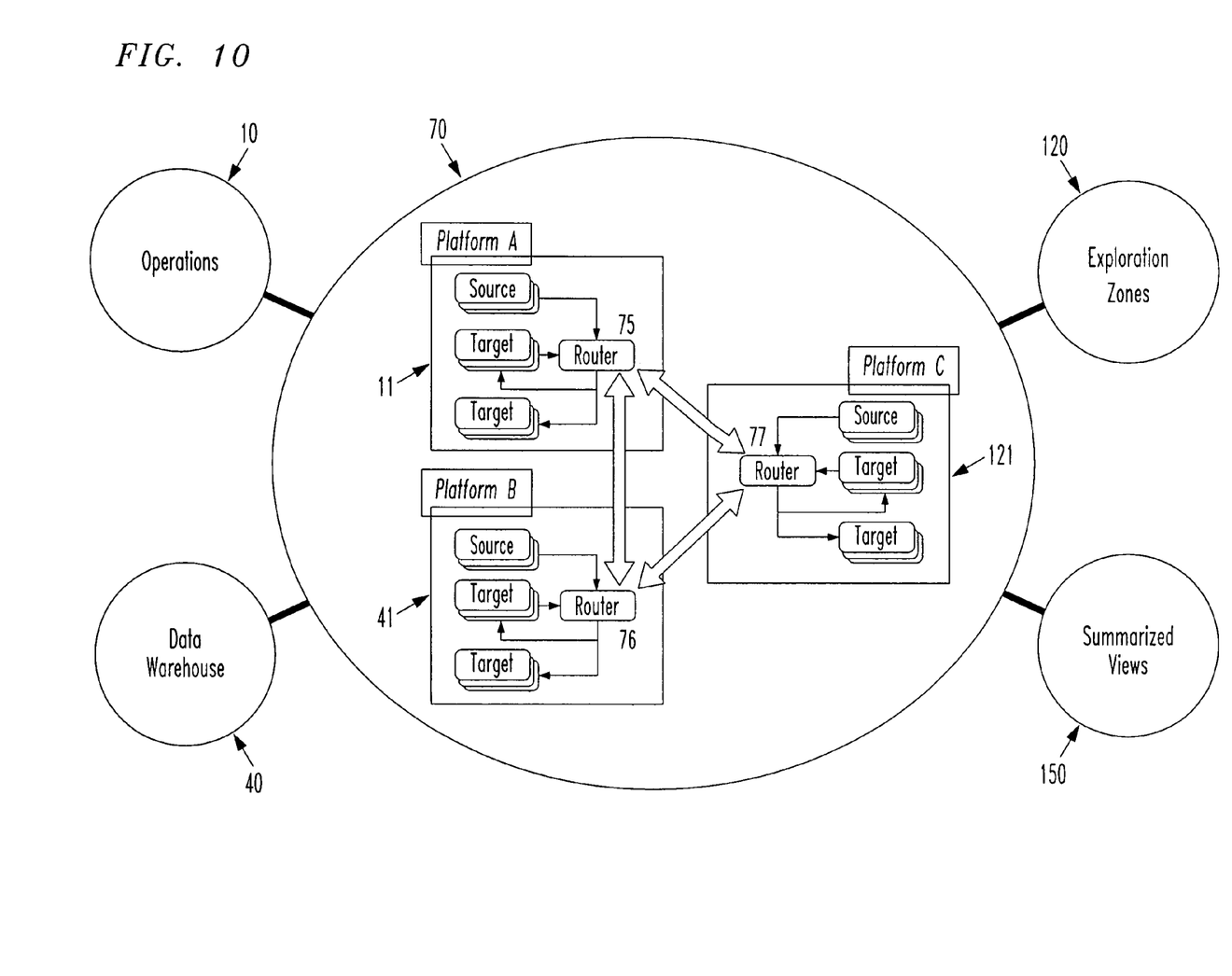
FIG. 10 depicts a general overview of how the Distributed ETL architecture integrates the various business enterprise information domains.

Integration of the various business enterprise information domains from FIG. 3 with the Distributed ETL architecture of FIG. 9 is depicted in FIG. 10. The information domains 10, 40, 120 and 150 link to a logical hub 70 to resolve their many-to-many relationships. Platforms A 11, B 41, and C 121 show the physical means by which this is accomplished within the logical hub. The physical platforms contain multiple source and target spokes, which could connect to any of the information domains. Information is shared between physical platforms through the routers that exist on each platform 75, 76, 77. FIG. 10 shows how the physical solution fits into the larger logical/conceptual picture.

In a typical embodiment, the information target comprises a data warehouse and a data mart. Since it can be quite cumbersome to access information from the data warehouse because of the large amounts of data and typically normalized data structures, a common IT design feature is to provide smaller information storage places that focus on a particular subject or department, called data marts. Historically, these can either be dependent data marts, which are subsets of the data warehouse, or independent data marts, which load information directly from operations (point to point). Data marts function to provide easier access to stored information. The data marts are highly indexed and optimized for query. Where one knows in advance the questions to be asked, data marts can be structured accordingly.

Legacy systems utilizing dependent data marts tend to be slow because it takes time to first load the data warehouse and then initiate another process to load the data marts. To reduce latency, an efficiency feature of the Distributed ETL invention loads information directly into 'co-dependent' data marts instead of the data warehouse. Co-dependent data marts are built using information that is dependent upon the same rules as the data warehouse but does not require the latency involved in writing to a data warehouse structure followed by extraction, transport and/or transformation and a final write to the dependent data mart.

The invention claimed is:

1. A method for delivering information within a computing environment, comprising:
   a) extracting information from an information source;
   b) transforming the extracted information;
   c) wrapping the transformed information into a message envelope having a standard format;
   d) routing the message envelope to at least one information target;
   e) unwrapping the message envelope to reveal the information received;
   f) mapping the received information to a format required by the information target;
   g) transforming the received information; and
   h) loading the received information into the information target,
wherein the extracting, transforming, and wrapping steps (a)–(c), respectively, are isolated from the routing step (d) such that the extracting, transforming, and wrapping steps may be executed simultaneously for a plurality of information sources distributed across the computing environment to produce a plurality of message envelopes and wherein the routing, unwrapping, mapping, transforming, and loading steps (d)–(h), respectively, are repeated for each of the plurality of message envelopes.

2. The method of claim 1 wherein the information is pulled from the source during the extracting step (a).

3. The method of claim 1 wherein the information is pushed from the source during the extracting step (a).

4. The method of claim 1 wherein the information extracted during step (a) comprises content changes to the source information at the time step (a) is performed as compared to the source information at a previous point in time.

5. The method of claim 1 wherein transforming the extracted information during step (b) further comprising applying one or more business rules to modify the extracted information.

6. The method of claim 1 wherein the message envelope further comprises an identification of the information source, a content definition identification and the content of the transformed information.

7. The method of claim 6 wherein the content definition identification is used to retrieve the content definition from a metadata repository.

8. The method of claim 6 wherein wrapping the message envelope further comprising retrieving content definition from a metadata repository and applying the content definition to the transformed information to produce a message envelope.

9. The method of claim 6 further comprising placing the message envelope into an inbox queue to a router component for routing according to step (d).

10. The method of claim 9 wherein the information sources publish the message envelope to the inbox queue and the router component subscribes to the inbox queue.

11. The method of claim 10 further comprising retrieving the message envelope from the inbox queue, looking up the address of the information target in a cross-reference table, and transmitting the message envelope to the information target.

12. The method of claim 11 wherein looking up the address of the information target is cross-referenced by the identity of the information source.

13. The method of claim 12 wherein the cross-reference table resides in local memory within the router component.

14. The method of claim 11 wherein transmitting the message envelope comprises placing the message envelope into an information target queue.

15. The method of claim 14 wherein the router component publishes the message envelope to the outbox queue and the information target subscribes to the outbox queue.

16. The method of claim 15 wherein the message envelope is retrieved from the outbox queue prior to unwrapping the message envelope.

17. The method of claim 8 wherein unwrapping the message envelope further comprising retrieving content definition from the metadata repository and applying the content definition to the message envelope to reveal the transformed information.

18. The method of claim 1 further comprising after unwrapping the message envelope, filtering the transformed information prior to loading the transformed information.

19. The method of claim 1 further comprising after unwrapping the message envelope, aggregating a plurality of transformed information and loading the aggregation of transformed information into the information target as a batch.

20. The method of claim 1 wherein the information target comprises a data warehouse and a data mart.

21. The method of claim 1 wherein the method for delivering information is executed on a plurality of computing platforms within the computing environment.

22. The method of claim 21 wherein the plurality of computing platforms comprise information domains for an enterprise.

23. A computer system for delivering information within a computing environment, comprising a method for:
   a) extracting information from an information source;
   b) transforming the extracted information;
   c) isolating the transformed information by wrapping the transformed information into a message envelope having a standard format;
   d) routing the message envelope to at least one information target;
   e) unwrapping the message envelope to reveal the transformed information;
   f) mapping the received information to a format required by the information target;
   g) transforming the received information; and
   h) loading the transformed information into the information target; wherein the routing step occurs at a different resource than the extracting, the transforming, and the loading steps (a)–(c) such that the extracting, transforming, and wrapping steps may be executed simultaneously for a plurality of information sources distributed across the computing environment to produce a plurality of message envelopes and wherein the routing, unwrapping, transforming and loading steps (d)–(h) are repeated for each of each of the plurality of message envelopes.

24. The computer system of claim 23 wherein the extracting, transforming, and isolating steps occur at the information source.

25. The computer system of claim 24 wherein the unwrapping and loading steps occur at the information target.

26. The computer system of claim 25 wherein the transforming step occurs prior to the isolating step.

27. The computer system of claim 26 wherein the extracting, transforming, and isolating steps occur prior to the routing step.

* * * * *